Sept. 8, 1970 — J. B. FIELDER ET AL — 3,527,918
TUBE PANEL WELDING APPARATUS
Filed June 30, 1967 — 5 Sheets-Sheet 1

INVENTORS
JOHN B. FIELDER
NORMAN D. FREEMAN
BY
ATTORNEY

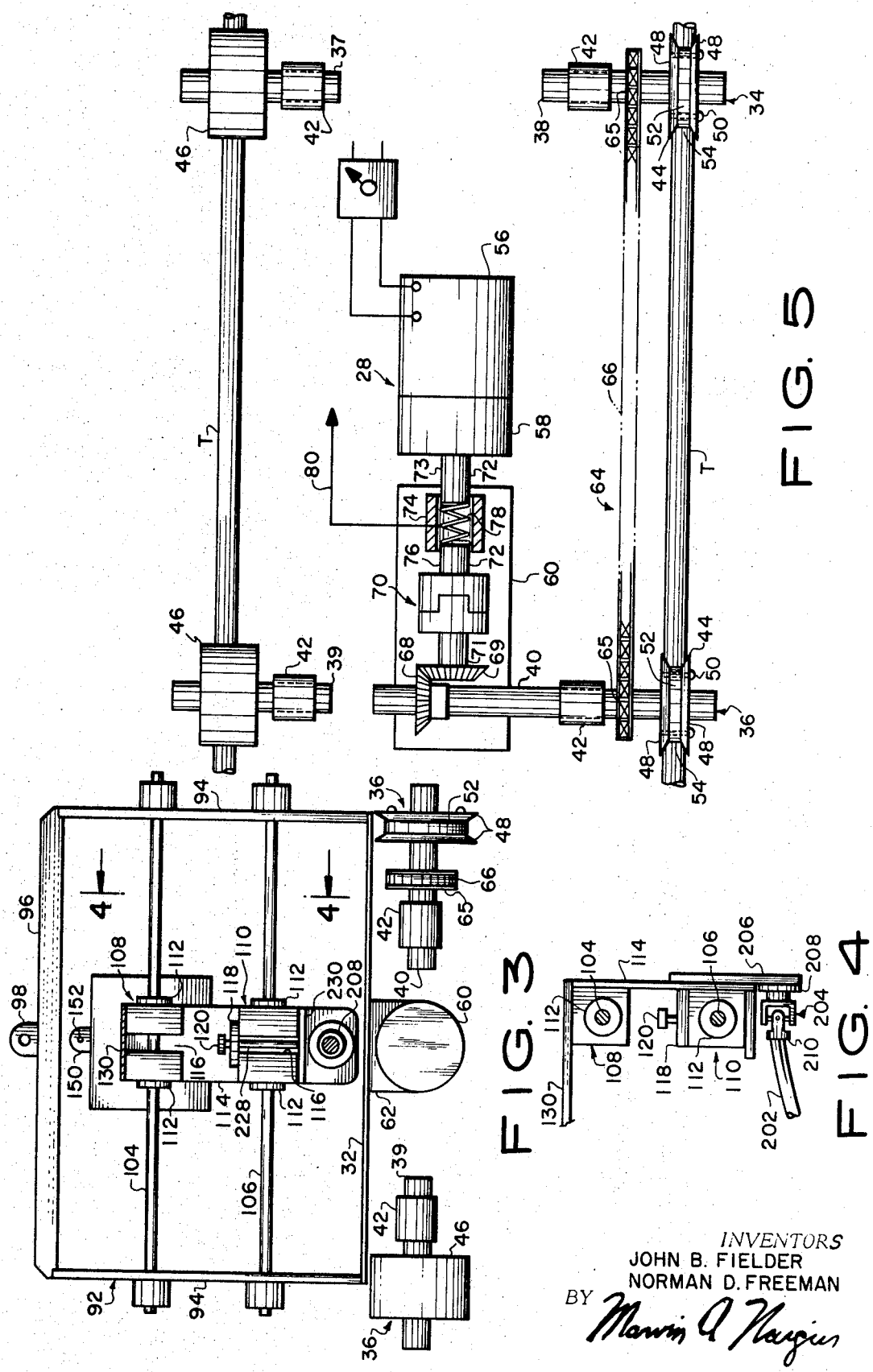

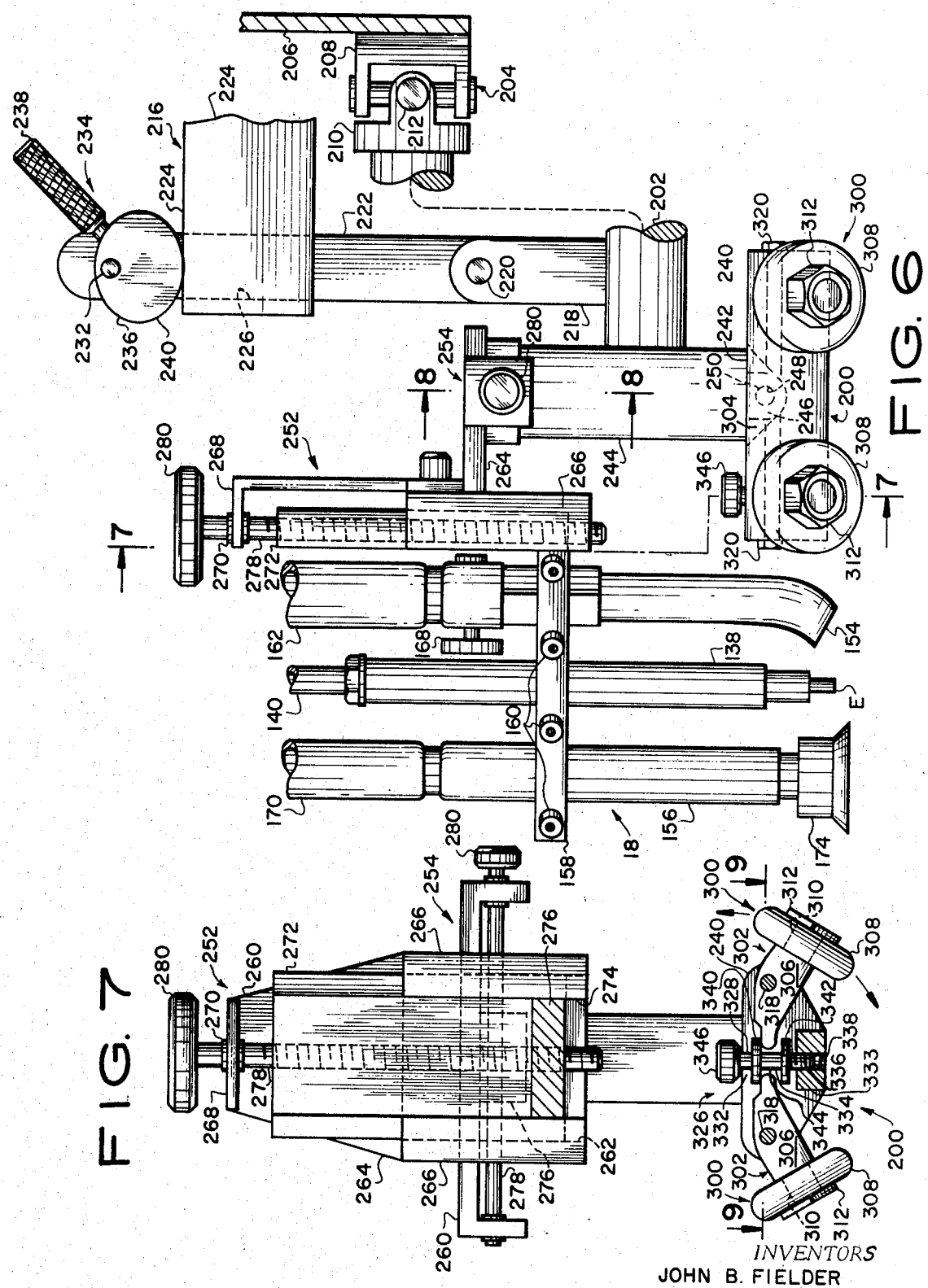

ID="3,527,918"
United States Patent Office 3,527,918
Patented Sept. 8, 1970

3,527,918
TUBE PANEL WELDING APPARATUS
John Bunnell Fielder and Norman Dale Freeman, Dansville, N.Y., assignors to Foster Wheeler Corporation, Livingston, N.J., a corporation of New York
Filed June 30, 1967, Ser. No. 650,473
Int. Cl. B23k 9/12
U.S. Cl. 219—125                                    7 Claims

ABSTRACT OF THE DISCLOSURE

Welding apparatus for fabricating elongated welds between tubes which are joined together to form a tube panel. A guidance system is provided for forming the elongated welds a uniform lateral distance away from the central axis of the tubes.

BACKGROUND OF THE INVENTION

In the manufacture of relatively large vapor generators, it is necessary to fabricate tube panels by joining together elongated tubes. The tube panels are usually formed by fabricated elongated welds either directly between the tubes or between fin walls which have already been welded to the opposite sides of the tubes. In this manner it is possible to utilize tube panels in vapor generators which are composed entirely of tubes or tubes separated by fin walls and also combinations thereof.

One of the major difficulties inherent in the welding of adjacent tubes or fin walls to form tube panels, is the nonuniformity of the elongated welds obtained through manual and other welding techniques. Conventionally, the elongated welds are formed by manually guiding the welding torch with the aid of a fixture device. The usual type of fixture comprises a platform having wheels with grooves which are mounted on the tubes along the upper surface of the tube panel. In this manner it is possible to mount the welding torch on the platform such that an operator can manually guide the torch along the welding junction while the platform is moved forward on the tube panel. Since the individual tubes are irregular, it is important that the operator constantly adjusts the position of the welding torch while the platform is being moved forward, in order to maintain the welding torch in the proper position. This type of equipment is not susceptible to automatic operation for increasing the integrity of the elongated welds. By utilizing welding apparatus in accordance with the instant invention, it is possible to automatically fabricate uniform elongated welds on tube panels. This is accomplished by providing guidance means, operatively connected between a carrier vehicle and a welding unit, for positioning the welding unit a constant lateral distance away from the tubes during the movement of the carrier vehicle. Thus, the elongated welds are uniformly formed between adjacent tubes or adjacent fin walls in accordance with the rate of movement of the carrier vehicle.

SUMMARY OF THE INVENTION

In accordance with an illustrative embodiment demonstrating features and advantages of the present invention, there is provided a welding apparatus adapted to fabricate elongated welds between elongated tubes joined together to form a tube panel. The welding apparatus comprises a carrier vehicle capable of being moved over the upper surface of the tube panel, and welding means movably mounted on the carrier vehicle for forming the elongated welds between adjacent tubes. There is also provided means operatively connected between the carrier vehicle and the welding means for laterally positioning the welding means a predetermind and constant lateral distance away from the tubes in accordance with the movement of the carrier vehicle.

BRIEF DESCRIPTION OF THE DRAWINGS

The above brief description, as well as further objects, features, and advantages of the present invention will be more fully appreciated by reference to the following detailed description of presently preferred but nonetheless illustrative embodiments in accordance with the present invention when taken in connection with the accompanying drawings wherein:

FIG. 3 is a transverse sectional view of the carrier vehicle taken along line 3—3 of FIG. 1;

FIG. 4 is a sectional view of a portion of the carrier vehicle shown in FIG. 3 taken through line 4—4;

FIG. 5 is a schematic plan view of the main motor drive which is shown isolated from the remainder of the welding apparatus and shown coupled to the axle of the carrier vehicle;

FIG. 6 is an enlarged elevational view of a portion of the welding apparatus shown in FIG. 1, with the welding means being shown for forming elongated welds at a predetermined and constant lateral distance away from the tubes;

FIG. 7 is a transverse sectional line taken along line 7—7 of FIG. 6 and showing the guidance system for adjustment in accordance with the tube size;

DESCRIPTION OF THE PREFERRED EMBODIMENTS

Figures 1, 2:
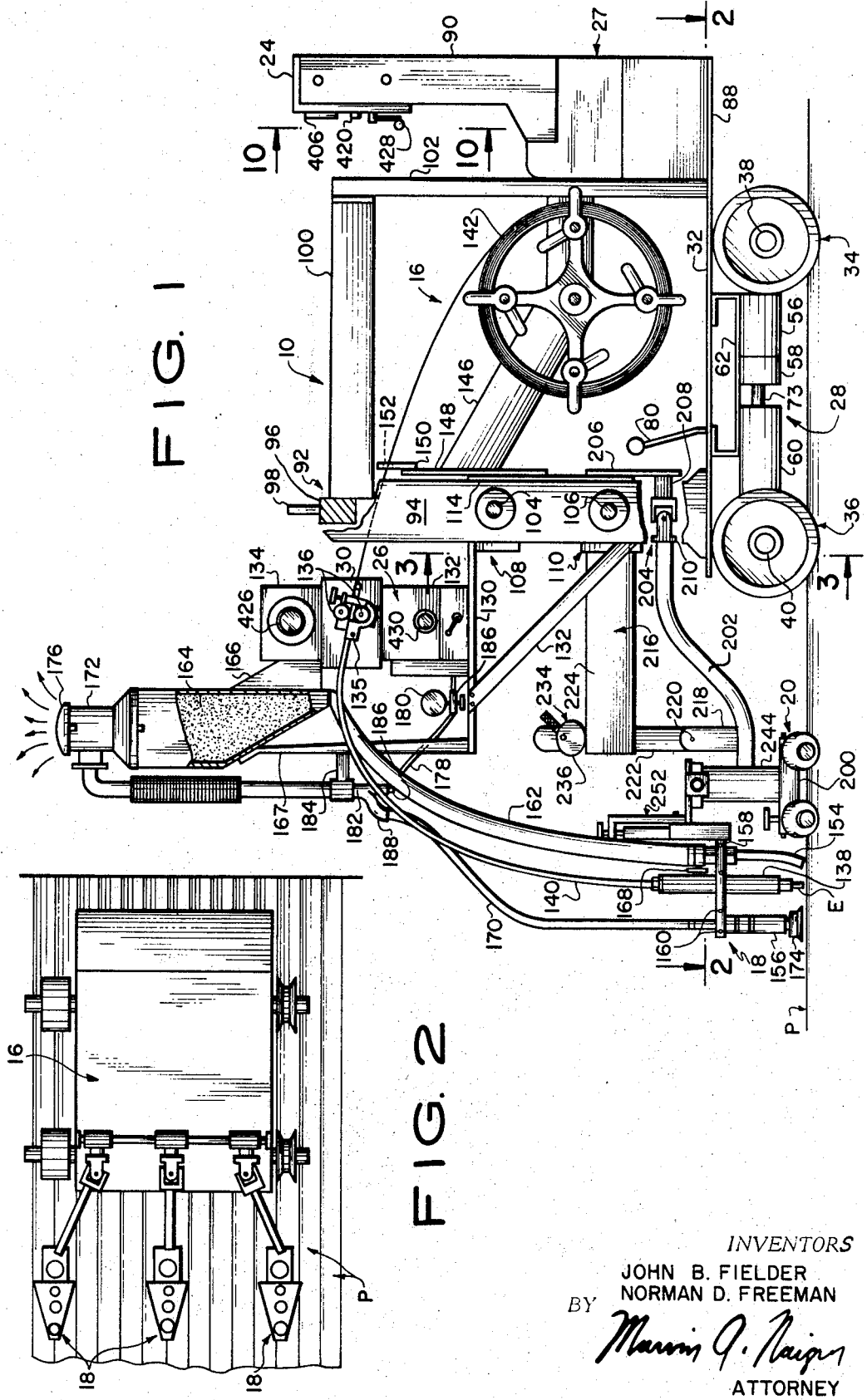
FIG. 1 is a front elevational view of a panel welding apparatus embodying features of the present invention.
FIG. 2 is a plan view of the welding apparatus shown in FIG. 1 with the usual single welding head being shown in the center, and two additional welding heads are provided for simultaneously forming three elongated welds.
Figure 8:
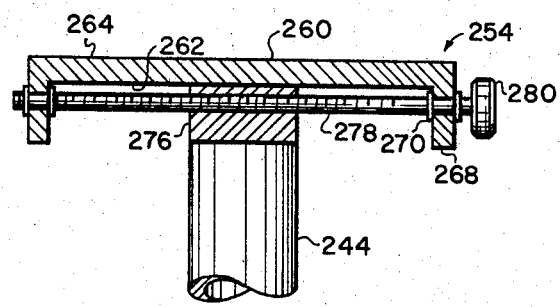
FIG. 8 is a transverse sectional view of a portion of the guidance system shown in FIG. 6 taken through line 8—8.
Figure 11:
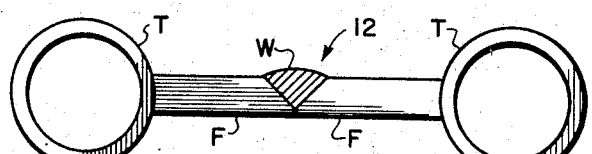
FIG. 11 is a sectional view of a fin-wall panel on which an elongated weld has been fabricated in accordance with the present invention.
Figure 12:
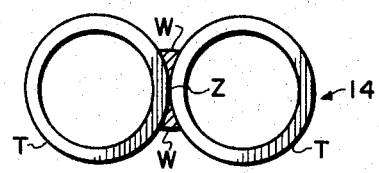
FIG. 12 is an enlarged sectional view similar to FIG. 3 but showing a tube-to-tube panel formed with an elongated weld in accordance with the present invention.

Referring now to the drawings for a more detailed description of the present invention and more particularly to FIG. 1, a tube panel welding apparatus generally designated by the reference numeral 10 is shown. A tube panel P is shown in FIG. 1 positioned above the floor level with the welding apparatus 10 mounted on panel P. It should be understood that the present invention is readily applicable to a variety of tube panels P including a fin-wall tube panel 12, as shown in FIG. 11 and a tube-to-tube panel 14, as shown in FIG. 12. The fin-wall tube panel 12 is comprised of elongated hollow tubes T which have elongated fin-walls F extending from opposite sides of the tubes T, and the fin-walls F are preferably welded to the tubes T prior to assembling the fin-wall panel 12. The fin-wall tubes are positioned in side-by-side relation in a coextensive plane such that the elongated welds W can be formed between the adjacent free edges of the fin-walls F, to complete the assembly of the fin-wall panel 12. The tube-to-tube panel 14 comprises the tubes T, positioned in a coextensive plane with the outer periphery of adjacent tubes T contacting each other tangentially. The assembly of the tube-to-tube panel 14 is completed by forming the elongated welds W between the tangential contact zone between the tubes T which is designated Z in FIG. 12. It should be noted that the tube panel welding apparatus 10 is also adaptable for use in the assembly of tube panels P which include combinations of fin-wall panel sections 12 and tube-to-tube panel sections 14.

The tube panel welding apparatus 10 comprises a carrier vehicle 16, at least one welding unit 18 movably mounted on the carrier 16, and a guidance system 20 operatively connected between the carrier 16 and each welding unit 18, such that the uniform welds W can be formed during the assembly of the tube panel P. It is preferable to position the various components of panel P on stanchions which have not been shown in the drawings. Thus, the components of the fin-wall tube panels 12 and tube-to-tube panels 14 are maintained in side-by-side relation at approximately chest level of the operator. The panel components will remain in this position until completion of the welding operation without any additional jigs or fixtures being required, since the substantial weight of the panel components serves to maintain them in a fixed position.

Figure 13:
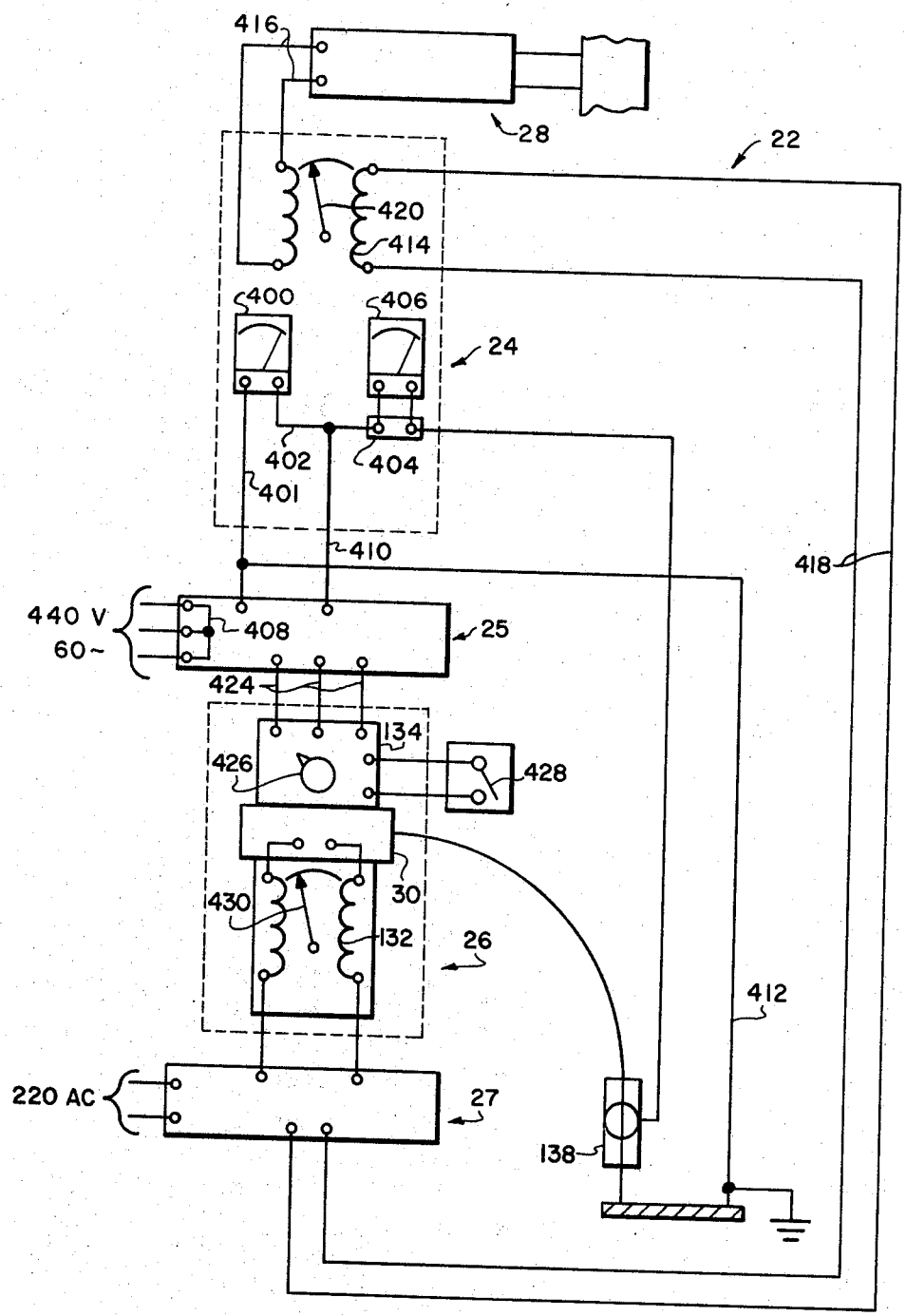
FIG. 13 is a schematic wiring diagram of the electrical energization circuit for the tube panel welding apparatus.

By referring to FIG. 13, it can be appreciated that the actual welding operation and mechanical movement of the welding apparatus 10 is controlled by an electrical circuit 22 in which there is provided a welding console 24, welding power supply 25, timer control 26, and magnetic amplifier 27. For supplying motive power to carrier vehicle 16, a main motor drive 28 is provided in welding console 24 which is electrically connected to magnetic amplifier 27. The welding unit 18 includes a wire feed motor 30 connected between timer control 26 and magnetic amplifier 27, such that the welding amperage can be varied in accordance with the wire feed rate along the panel P. The electrical connections will be more fully described in connection with the circuit 22 shown in FIG. 13.

Referring to FIG. 1, the carrier vehicle 16 includes a platform 32 which is supported on the panel P for movement along the central axis of the tubes T by means of a front axle assembly 34 and a rear axle assembly 36. As shown in FIG. 5, the front axle assembly 34 and rear axle assembly 36, respectively include split front axles 37, 38 and split rear axles 39, 40 which are journaled on carrier vehicle 16 by means of four trunnion arms assemblies 42, which are secured beneath platform 32. A pair of grooved wheels 44 are mounted for rotation on split axles 38 and 40 and a pair of flat wheels 46 are mounted for rotation on split axles 37 and 39. By referring to FIG. 5, it can be appreciated that the grooved-wheels 44 and flat wheels 46 are in alignment on opposite sides of platform 32. The grooved wheels 44 are each comprised of two frustoconical sections 48 which are joined together by the set screws 50, with spacer discs 52 being provided for positioning between sections 48, such that an annular groove 54 is formed in accordance with the outer configuration of the tubes T. Thus, it can be appreciated that the grooves 54 are sized to conform to the smallest tube diameter when the spacer discs 52 are removed, with additional spacer discs 52 being inserted between sections 48 for welding tubes T having a larger outer diameter. The flat wheels 46 are provided with a relatively wider outer circular surface, such that wheels 46 will rest on a tube surface when the grooves 54 of wheels 44 are in position. In this manner, it is possible to move the carrier vehicle 16 along the central axis of the tube T which is being welded, with grooves 54 keyed to a single tube T and platform 32 maintained level with respect to the upper surface of the tube panel P.

The main motor drive 28 for moving the carrier vehicle 16 along the tube panel P comprises an electric motor 56 which includes a built-in geared reduction unit 58, and a gear-clutch unit 60. The housing for motor 56 and reduction unit 58 and the housing for gear-clutch unit 60 are supported beneath the platform 32 by means of a bracket assembly 62. As best shown in FIG. 5, the split shafts 38 and 40 are coupled for simultaneous rotation by a chain drive 64 which includes sprockets 65 mounted on split shafts 40 and 42, with a continuous chain 66 entrained over the sprockets. The gear-clutch unit 60 comprises a drive bevel gear 68 which is keyed to axle 40 and meshes with a driven bevel gear 69 which is coupled to a clutch assembly 70 by means of a stub shaft 71. The clutch assembly 70 is driven by a shaft assembly 72 which includes a first shaft 73, which is coupled to the gear reduction unit 58 and journaled in a shift bearing assembly 74, and a second shaft 76 which is keyed to clutch assembly 70. Shafts 73 and 76 are joined together for conjoint rotation by a compression spring 78 in shift bearing assembly 74 such that the clutch assembly 70 is normally biased in the drive position for rotating split axle 40 which transmits rotation to split axle 38 by means of chain drive 64. A shift handle 80, which is shown schematically in FIG. 5, is operatively connected to compression spring 78 for releasing the clutch assembly 70 when it is necessary to stop movement or manually move carrier vehicle 16.

The platform 32 supports a welding series contact housing 88, on which there is mounted the magnetic amplifier 27, and the welding console 24 is held above magnetic amplifier 27 by means of brackets 90. Mounted on platform 32 above axles 39 and 40 is a main support stanchion 92 which includes a pair of spaced-apart upright columns 94 between which there is welded a crossbeam 96. Medially located on crossbeam 96 is a hook 98 for attaching a crane hoist to lift the welding apparatus off of the tube panel P. Referring to FIG. 1, a horizontal brace beam 100 is welded to cross beam 96 adjacent to hook 98 and a center brace post 102 is welded to crossbeam 96 and platform 32.

As best shown in FIG. 3, an upper axle 104 and a lower axle 106 are secured between columns 94, for slideably mounting an upper support block 108 and a lower support block 110, respectively. The support blocks 108 and 110 are formed with internal horizontal through bores, in which there is mounted sleeve bearings 112 for receiving axles 104 and 106, respectively. It is preferable to fabricate support blocks 108 and 110 as assemblies of two individual blocks which are bored for receiving two sleeve bearings 112. A vertical connecting plate 114 is secured to mounting blocks 108 and 110, such that a center channel 116 is formed between each of the individual blocks. A horizontal locking plate 118 is mounted on top of lower block 110, for threadably engaging a lockscrew 120. In this manner the coupled mounting blocks 108 and 110 can be locked in a fixed horizontal position by bringing lockscrew 120 into contact with lower axle 106.

A bracket plate 130 is mounted on support block 108 with support rods 132 extending from the opposite sides of plate 130 to block 110. The timer control 26 and wire feed motor 30 are mounted on bracket plate 130, and timer control 26 includes a separately housed wire feed motor control rheostat 132 and welding voltage control 134. As best shown in FIG. 1, the housing of rheostat 132 is mounted on bracket plate 130 and the housing of wire feed motor 30 is mounted on rheostat 132, with the housing of welding control 134 mounted on top of the wire feed motor 30. The wire feed motor 30 comprises a standard welding wire drive 135 which includes two wheels 136 rotating in opposite directions for feeding the wire. It should be noted that wire feeding devices, such as drive 135, are well known in the welding art, and for the sake of clarity, the wire feed motor 30 has been shown schematically in the drawings.

The welding unit includes a welding torch 138 which is provided with a supply line 140 that is connected to wire feed drive 135. A continuous supply of consumable electrode is supplied from a wire spool 142 which is rotatably mounted on a diagonal beam 146 that is carried by an extension plate 148 which is fixed to plate 114. Thus, the wire spool 142 is securely mounted on carrier vehicle 16, and is keyed to the position of support blocks 108, 110 in order to be free to rotate for supplying wire to welding torch 138. The wire from spool 142 is trained through an upright bar 150 which is formed with an opening 152 for guiding the wire to drive 135, and the wire is fed through supply line 140 into welding torch 138, with the leading edge of the wire serving as a consumable electrode, designated E.

The welding unit 18 is provided with an associated flux nozzle 154 and suction nozzle 156 which are mounted on the opposite sides of welding torch 138 by means of a two-piece plate 158 that is clamped together by set screws 160. The flux nozzle 154 is connected to a flux conduit 162 which is in gravity flow communication with a flux hopper 164 that is mounted on an L-shaped bracket 166 which is fixed to the housing of wire feed motor 30. An upright support arm 167 is mounted on bracket plate 130 to brace the flux hopper 164. The flux nozzle 154 is provided with an adjustable valve 168 for controlling the downward release of flux from the hopper 164. A vacuum hose 170 is connected between suction nozzle 156 and a vacuum chamber 172 which is mounted on top of flux hopper 164. The suction nozzle 156 includes an enlarged extension 174 and an air exhaust retort 176 is provided in vacuum chamber 172. It is preferable to operate suction nozzle 156 by means of compressed air, which is usually available from a central compressor in most large plants. The compressed air is passed through an air line 178, having an air gauge 180, into a bifurcated fitting 182 connected in vacuum hose 170 and mounted on support arm 167 by a clamp rod 184. The air gauge 180 is provided with a valve fitting 186 for regulating the air pressure. As shown in FIG. 1, the bifurcated fitting 182 includes an air supply leg 186 and flow leg 188, which is in substantial alignment with, and an integral part of, the flow path of vacuum hose 170. Thus, by introducing compressed air through line 178, a suction vacuum is created in leg 188 such that the spent flux material is sucked into nozzle 156 through hose 170 into vacuum chamber 172.

The guidance system 20 includes a skate vehicle 200, for mounting the welding unit 18, that is operatively connected to carrier 16 by means of a tiller arm 202, one end of which is secured to skate vehicle 200. A universal joint 204 is connected between the freee end of tiller arm 202 and an extension plate 206 which is mounted to plate 114. The universal joint 204 comprises a fixed joint 208 which is secured to plate 206 and a movable joint 210 coupled to joint 208 by a universal hinge assembly 212 for movement of tiller arm 202 in a vertical and horizontal direction with respect to carrier 16. By progressively inspecting FIGS. 1 and 6, it can be seen that tiller arm 202 is also operatively connected to carrier 16 by means of a rudder assembly 216 which includes a vertical arm 218, one end of which is fixed to tiller arm 202 and the other end of which is provided with a pin and slot assembly 220, for hinging a vertical adjustment arm 222. A horizontal rudder plate 224, formed with a vertical slot 226 for slidably receiving arm 222, is hinged to support block 110 by means of a vertical pin 228 which is mounted between the locking plate 118 and a lower plate 230 which is fixed to the bottom portion of block 110. The upper free end of adjustment arm 222 is provided with a horizontal pin 232 for journaling a lift assembly 234 which includes a pair of spaced apart integrally formed cams 236 and a lever arm 238. The cams 236 have coextensive cam surfaces separated by a slot for receiving adjustment arm 222 with pin 232 extending through cams 236 and arm 222 to journal lift assembly 234 for cam contact against the upper surface of rudder panel 224. Thus, when the rearward eccentric surfaces of cams 236, which have been designated 240, are brought into contact with rudder panel 224 by moving arm 238 forward, vertical arm 222 will be raised upwardly in slot 226. This results in the arm 218 raising the tiller arm 202 and skate vehicle 200, such that welding unit 18 can be brought out of contact with the panel P, for swinging the skate vehicle 200 to an adjacent tube T after completing the elongated weld W.

The skate vehicle 200 includes a platform bed 240 formed with an upper slot 242 which is located in the center of platform bed 240 for mounting a vertical cylinder 244. The tiller arm 202 is secured to cylinder 244 at the end opposite from universal joint 204. A finger tab 246 having a through bore 248, integrally formed on the lower end of vertical cylinder 244, is mounted on platform bed 240 in upper slot 242 by means of a pin 250 which is received in through bore 248. By journaling platform bed 240 for vertical rotation in accordance with the longitudinal axis of the tubes T, it is possible to translate movement from welding unit 18 due to irregularity in the surface of tube panel P, without effecting the location of the weld W.

By referring to FIGS. 6 and 7, it can be seen that cylinder 244 is provided with a vertical adjustment mechanism 252 and a lateral adjustment mechanism 254 for respectively adjusting the height of welding unit 18 from the tube panel P and adjusting the lateral distance of the welding unit 18 from a tube T, prior to commencing the welding operation. Since adjustment mechanisms 252 and 254 are substantially identical, the same reference numerals will be used to refer to like parts. Accordingly, the lateral adjustment mechanism 252 and vertical adjustment mechanism 254 comprise a fixed housing 260 formed with an internal channel 262. The housing 260 is defined by a main wall 264, two spaced-apart upstanding sidewalls 266 which form channel 262, and a lateral wall 268 having a through opening for receiving a bushing 270. The internal channel 262 is sized to slideably receive a plate bar 272 which is formed with a lower channel 274 for mounting an internally threaded nut plate 276. An externally threaded shaft 278 is threadably engaged with the nut plate 276 and is positioned in lower channel 274 for being journaled in bushing 270. The adjustment mechanisms 252 and 254 are operated by screw knobs 280 which are fixed to shafts 278. The nut plate 276 is fixed to plate 158 for vertical adjustment mechanism 252 and is fixed to cylinder 244 for lateral adjustment mechanism 254. The main wall 264 of vertical adjustment mechanism 252 is fixed to main wall 264 of lateral adjustment mechanism 254. Thus, by rotating the screw knob 280 of lateral adjustment mechanism 254, the plate bar 272 is moved laterally in channel 262. In this manner, the welding unit 18 which is carried by vertical adjustment mechanism 254 is positioned at the proper distance from the tube T which is to be welded. The screw knob 280 of vertical adjustment mechanism 252 can then be rotated to raise and lower welding unit 18 into position at the proper distance from the tube panel P.

Figure 9:
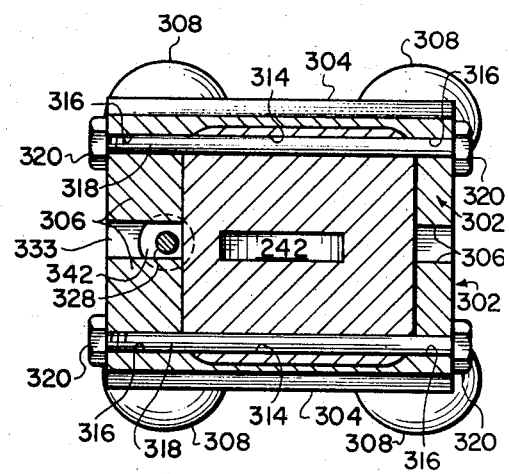
FIG. 9 is a longitudinal sectional view of a portion of the guidance system shown in FIG. 7 taken through line 9—9.
Figure 10:
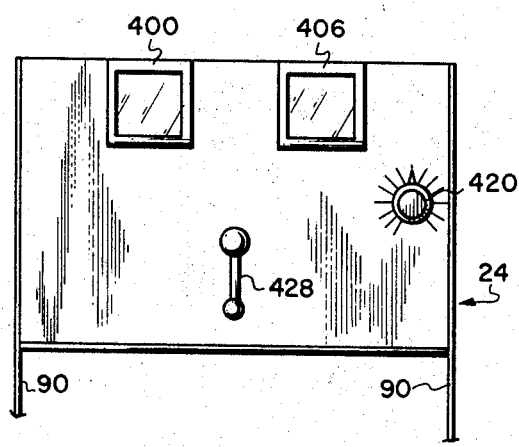
FIG. 10 is a transverse sectional view of the welding control panel on the carrier vehicle taken through line 10—10 of FIG. 1.

In order to utilize the skate vehicle 200 on various tube size diameters, tube contact means 300 are operatively connected to platform bed 240. As best shown in FIG. 9, the tube contact means 300 includes a pair of trunnion arms 302 having a generally C-shaped configuration which is defined by an integrally formed central leg 300 and two spaced-apart side legs 306. A pair of the contacting wheels 308 are rotatably mounted on each trunnion arm 302 by means of stub shafts 310 and thrust washers 312. The internal portions of the central legs 304 are sized to mate loosely on opposite sides of platform bed 240 which is formed with elongated through bores 314 that are in alignment with through bores 316 formed in each of the side legs 306. A mounting shaft 318 is received in each of the through bores formed by aligned bores 314 and 316, with bolts 320 being threadably engaged on the outer ends of shafts 318. It should be noted that the elongated through bores 314 are sized to obtain a press-fit with shafts 318, to thereby securely mount shaft 318 on platform bed 240, and the through bores 316 are sized with internal diameters that are larger than the external diameters of shafts 318. In this manner, the shafts 318 are fixed to platform bed 240, with the trunnion arms 302 being hingedly mounted on the outer ends of shafts 318. The trunnion arms 302 are operated together in sequence and maintained in position by an adjustment key mechanism 326 which includes a vertical shaft 328 journaled in a through opening 332 that is formed at the rearward end of platform bed 240. A mounting block 333 is secured in an internal chamber 334 which is formed in the bottom of platform bed 240. The lower end of shaft 328 is formed with external threads 336 for engagement with an internally threaded through bore 338 which is formed in mounting block 333. For receiving and positioning the rear side legs 306 of trunnions 302, an upper washer 340 and spaced-apart lower washer 342 are mounted on shaft 328. The washers 340 and 342 form an annular channel 344 which is sized to bring the rear side legs 306 in mating contact with the inner faces of the washers and an adjustment knob 346 is mounted at the upper end of shaft 328 By rotating knob 346 in either direction, it is possible to raise and lower the trunnion arms 302 with respect to platform bed 240, thereby increasing and decreasing the distance between opposite contacting wheels 308. Accordingly, each of the contacting wheels 308 are mounted at the same angle of rotation with respect to the center line of platform bed 240. This angle of rotation can be increased and decreased by rotating shaft 328 such that the trunnion arms 302 are respectively raised and lowered, in sequence. Thus, the contacting wheels 308, can be adjusted in accordance with the different diameters of the tubes T.

By referring to FIG. 13, the electrical circuit 22 of welding apparatus 10 can best be seen. This electrical circuit 22 includes the welding console 24 which is provided with welding voltage meter 400, connected between the welding power supply 25 by a line 401 and a line 402 which passes through a shunt 404 for welding amperage meter 406. A three-pole magnetic contactor 408 is provided in welding power supply 25. The power supply 25 is connected to console 24 by means of a line 410 and line 401 with the welding torch 138 grounded by a ground wire 412 which is connected to line 401. The welding console 24 also includes a main drive rheostat 414 which is connected between drive motor 28 and magnetic amplifier 27 by lines 416 and 418 respectively. A control dial 420 is provided in rheostat 414 for varying the speed of drive motor 28. The welding power supply 25 is connected to a standard 440 volt three phase input line and to wire feed motor 30 and the welding voltage control 134 by lines 424. The welding voltage control 134 is provided with a control dial 426 for varying the open circuit welding voltage and a switch 428 for actuating the welding voltage. The wire feed rheostat 132 includes a control dial 430 and is connected between wire feed motor 30 and the magnetic amplifier 27. Thus, it can be appreciated that by adjusting dials 420, 426, and 430, it is possible to respectively vary the speed of drive motor 28, the welding voltage, and the speed of wire drive motor 30. Accordingly, the carrier vehicle 16 can be made to move along the upper surface of the panel P at a rate of speed in accordance with the rate of wire fed from motor 30 and the weld setting of control 134, to obtain a uniform weld W. In this manner, the elongated welds W are uniformly formed between adjacent fin-wall F or adjacent tubes T in accordance with the position of the carrier vehicle 16 along the tube panel P. Thus, the contacting wheels 308 engage the tube T, adjacent to which the elongated weld W is being fabricated. During the welding operation, the welding torch 138, by virtue of its mounting on skate vehicle 200, is maintained a uniform lateral distance away from the tube T, adjacent to the elongated weld W. This uniform lateral distance for each elongated weld W is a function of the contact between skate vehicle 200 and the tube T, and is not controlled by the carrier vehicle 16. By providing the universal joint connection 204 between the tiller arm 202 and carrier vehicle 16, it is possible for skate vehicle 200 to move vertically and laterally along the longitudinal axis of the tube T in response to contact between wheels 308 and the tube T. The carrier vehicle 16 can be provided with any number of welding units 18 as demonstrated by the three-unit welding apparatus shown in FIG. 2.

The welding apparatus 10, in accordance with the present invention is capable of forming one or more uniform elongated welds W. This is achieved by moving carrier vehicle 16 forward with the welding unit or units 18 trailing behind. After completing a given welding pass, the rudder panel 224 is engaged by the lift assembly 234 to raise the skate vehicle 200 above, and out of contact with, the surface of panel P. The main drive motor 28 can then be reversed to return carrier vehicle 16 to its starting position to begin another welding pass, with the rudder panel 224 first being swung, to position the skate vehicle 200 above the next adjacent tube T which is to be welded. In the event that the tube panel P is too wide to complete all of the welding passes by changing the position of rudder panel 224, it is then necessary to move the welding apparatus 10 by attaining a crane hoist to hook 98. It should be understood that the apparatus 10 is capable of fabricating elongated welds W up to the end portion of the tube panel P on which the carrier vehicle 16 is resting when a welding pass has been completed. This end portion of the tube panel P can be welded by a 180-degree reverse in the direction of movement of carrier vehicle 16, such that the weld unit 18 is moved forward for each of the unfinished lengths of tube T, in a manner similar to the preferred mode of operation, wherein the welding unit 18 precedes the carrier vehicle 16.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A welding apparatus adapted to fabricate elongated welds between elongated tubes formed with fin walls on either side and joined together in side-by-side relation to form a fin-tube panel, comprising a carrier vehicle including a platform and motor driven wheels supporting said platform on said tubes for movement along the central axis of one of said tubes and over the upper surface of said tube panel, welding means movably mounted on said carrier vehicle for forming said elongated welds between the outer edges of adjacent fin walls, means for synchronizing the rate of welding of said welding means with the rate of movement of said carrier vehicle, guide means operatively connected between said carrier vehicle and said welding means for positioning said welding means for positioning said welding means a constant lateral distance away from said tubes during the movement of said carrier vehicle, such that said elongated welds are uniformly formed between adjacent fin-walls in accordance with the position of said carrier vehicle along said tube panel, said guide means including a universal joint connected between said carrier vehicle and welding means, and a skate vehicle connected to said universal joint, said skate vehicle including a platform bed with tube contact means operatively connected to said platform bed, such that said welding means is capable of moving horizontally and vertically in accordance with the configuration of said upper surface of the tube panel.

2. A welding apparatus according to claim 1 in which said welding means includes a welding gun, flux hopper and vacuum unit for withdrawing spent flux.

3. A welding apparatus according to claim 1 in which said tube contact means includes a pair of trunnion arms pivotally connected to said platform bed and a pair of contacting wheels mounted for rotation on each trunnion arm.

4. A welding apparatus according to claim 3 in which each of said trunnion arms includes an integrally formed central leg and a pair of spaced apart side legs, and said platform bed sized to fit between each pair of said side legs.

5. A welding apparatus according to claim 4 in which each pair of said side legs and the portion of said platform bed therebetween are formed with an aligned through bore which is sized for receiving a horizontally disposed shaft in press-fit engagement with the platform bed and hinged engagement with the side legs.

6. A welding apparatus according to claim 3 in which an adjustment shaft is mounted on said platform bed and operatively connected to said trunnion arms such that each pair of contacting wheels can be moved apart and together in accordance with the diameter of said tubes.

7. A welding apparatus according to claim 6 in which said adjustment shaft is formed with external threads, said platform bed has a vertical bore formed with internal threads for threadable engagement with said adjustment shaft, and a pair of adjustment washers mounted on said adjustment shaft to form a channel for receiving the end portion of a pair of opposing side arms, whereby vertical movement of said adjustment shaft will impart tilting movement to said trunnion arms.

References Cited

UNITED STATES PATENTS

| | | | |
|---|---|---|---|
| 2,432,495 | 12/1947 | Baird | 219—125 |
| 2,439,740 | 4/1948 | Johnson | 219—125 |
| 3,076,889 | 2/1963 | Enk | 219—125 |
| 1,029,389 | 6/1912 | Metzger | 219—125 |
| 1,938,819 | 12/1933 | Eskilson | 219—125 X |
| 2,423,190 | 7/1947 | Kennedy | 219—130 |
| 3,258,577 | 6/1966 | Smith | 219—137 |

FOREIGN PATENTS 590,037 1/1960 Canada.

ANTHONY BARTIS, Primary Examiner

L. A. SCHUTZMAN, Assistant Examiner

U.S. Cl. X.R.

228—45